US008908677B2

(12) United States Patent
Welin et al.

(10) Patent No.: US 8,908,677 B2
(45) Date of Patent: Dec. 9, 2014

(54) COMMUNICATIONS NETWORK AND A METHOD IN A COMMUNICATIONS NETWORK

(75) Inventors: Annikki Welin, Solna (SE); Christian Gotare, Getinge (SE); Johan Kolhi, Vaxholm (SE); Tomas Thyni, Jarfalla (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 148 days.

(21) Appl. No.: 13/376,877

(22) PCT Filed: Jun. 9, 2009

(86) PCT No.: PCT/SE2009/050693
§ 371 (c)(1),
(2), (4) Date: Dec. 8, 2011

(87) PCT Pub. No.: WO2010/144001
PCT Pub. Date: Dec. 16, 2010

(65) Prior Publication Data
US 2012/0075995 A1    Mar. 29, 2012

(51) Int. Cl.
*H04L 12/26* (2006.01)
*H04L 12/701* (2013.01)
*H04L 12/12* (2006.01)
*H04L 12/707* (2013.01)
*H04L 12/723* (2013.01)
*H04L 12/721* (2013.01)
*H04L 12/729* (2013.01)
*H04L 12/24* (2006.01)

(52) U.S. Cl.
CPC ............ *H04L 43/0876* (2013.01); *H04L 45/00* (2013.01); *H04L 12/12* (2013.01); *Y02B 60/35* (2013.01); *H04L 45/24* (2013.01); *H04L 45/50* (2013.01); *Y02B 60/34* (2013.01); *H04L 45/70* (2013.01); *H04L 45/125* (2013.01); *H04L 41/0823* (2013.01)
USPC ............ 370/352; 370/349; 370/389; 370/401

(58) Field of Classification Search
USPC .................................... 370/225, 235
See application file for complete search history.

(56) References Cited

U.S. PATENT DOCUMENTS 6,778,492 B2 *  8/2004  Charny et al. ................. 370/228
7,174,389 B2 *  2/2007  Orava et al. ................... 709/239

(Continued)

OTHER PUBLICATIONS

Woo, K., et al., "Non-Blocking, Localized Routing Algorithm for Balanced Energy Consumption in Mobile Ad Hoc Networks", Modeling, Analysis and Simulation of Computer and Telecommunication Systems, 2001 Proceedings, Ninth International Symposium on Aug. 15-18, 2001, Piscataway, NJ, USA, IEEE, Aug. 15, 2001, pp. 117-124, XP010555696.

(Continued)

*Primary Examiner* — Edan Orgad
*Assistant Examiner* — Emmanuel Maglo
(74) *Attorney, Agent, or Firm* — Rothwell, Figg, Ernst & Manbeck P.C.

(57) ABSTRACT

End-to-end communication in a communications network is controlled by determining, based on monitoring of traffic in the communications network, the number of paths, or links, needed between the first and the at least second network element. If it is determined, based on the traffic load, that not all available paths are needed:—Selecting at least one path that should not be used to carry traffic,—Rerouting any traffic using the selected at least one path to at least one alternative path, and—Placing any network elements or links not carrying traffic after the rerouting in standby mode in which the power consumption of the elements is reduced, to reduce the power consumption in the network.

6 Claims, 3 Drawing Sheets

(56) References Cited

U.S. PATENT DOCUMENTS

| | | | |
|---|---|---|---|
| 7,339,489 B2* | 3/2008 | Arita et al. | 340/693.3 |
| 7,602,706 B1* | 10/2009 | Gardo et al. | 370/219 |
| 7,787,362 B2* | 8/2010 | Xu | 370/217 |
| 8,463,120 B2* | 6/2013 | Zhang et al. | 398/5 |
| 2003/0152024 A1* | 8/2003 | Yang et al. | 370/216 |
| 2005/0013242 A1* | 1/2005 | Chen et al. | 370/228 |
| 2005/0207337 A1* | 9/2005 | Oda et al. | 370/214 |
| 2006/0182035 A1* | 8/2006 | Vasseur | 370/238 |
| 2006/0203720 A1* | 9/2006 | Kano | 370/228 |
| 2007/0105562 A1* | 5/2007 | Ji | 455/452.1 |
| 2007/0160061 A1 | 7/2007 | Vasseur et al. | |
| 2007/8016006 | 7/2007 | Vasseur et al. | |
| 2007/0201380 A1 | 8/2007 | Ma et al. | |
| 2008/0117806 A1* | 5/2008 | Xu | 370/217 |
| 2008/0192627 A1* | 8/2008 | Lichtwald | 370/228 |
| 2010/0208741 A1* | 8/2010 | Vasseur | 370/400 |
| 2012/0207012 A1* | 8/2012 | Kompella | 370/216 |

OTHER PUBLICATIONS

Kyungtae Woo, Non-Blocking, Localized Routing Algorithm for Balanced Energy Consumption in Mobile Ad Hoc Networks, IEEE, 2001, pp. 117-124.

Lou Berger, draft-ietf-mpls-gmpls-tap-reroute-03.txt, Nov. 25, 2008, 27 pages.

Sadasivan, G. et al., "Architecture for IP Flow Information Export Draft-ietf-ipfix-architecture-12," Sep. 6, 2006, IP Flow Information Export WG (ipfix), Internet-Draft, 28 pages.

* cited by examiner

COMMUNICATIONS NETWORK AND A METHOD IN A COMMUNICATIONS NETWORK

CROSS-REFERENCE TO RELATED APPLICATION

This application is a 35 U.S.C. §371 National Phase Entry Application from PCT/SE2009/050693, filed Jun. 9, 2009, and designating the United States.

TECHNICAL FIELD

The present invention relates to a communications network and to a method of controlling such a communications network.

BACKGROUND AND RELATED ART

In all areas of society there is an increasing desire to be environmentally friendly. One important aspect of this is to make existing applications more energy efficient. Preferably power consumption should be reduced without reducing the performance of the application as perceived by the user.

Today Central Processing Units (CPU) can be made more and more energy efficient even with a high processing power. There is a desire to achieve more energy-efficient operator networks. The term operator network in this document is intended to cover backbone networks such as operator networks or enterprise networks, that is, a part of a network infrastructure interconnecting other pieces of network, providing connections between, for example, access networks and/or local networks such as Local Area Networks (LAN), business networks, etc.

The question of energy efficiency in operator networks is addressed in the prior art, for example by the introduction of blade servers. A blade server is a self-contained computer server having all the computer functions of a server but with some support functions centralized to a blade enclosure arranged to provide for several blade servers. Typically, the blade enclosure provides services such as power, cooling, networking, various interconnects and management. This reduces the physical space required by the servers and also the power requirements.

Virtualization also enables energy efficiency to some extent. The concept of virtualization covers different types of abstraction of computer or network resources, to enable a more efficient use, for example, by dividing physical networks into a number of logical networks. Such technologies include virtual networks such as Virtual Private Networks (VPN) and Virtual Local Area Networks (VLAN). The Ethernet headers will include information regarding these different types of connections.

For example, Virtual Private Network (VPN) connections may be used, in which case the Ethernet headers will include information regarding VPN services. In a virtual private network (VPN) links between nodes may be carried by open connections or virtual circuits in a larger network, such as the Internet, as opposed to running across a single private network. The Link Layer protocols of the virtual network are said to be tunneled through the transport network. One common application is to secure communications through the public Internet, but a VPN does not need to have explicit security features such as authentication or content encryption.

VLAN technologies enable the creation of independent logical networks within a physical network. Technologies for VLAN include, but are not limited to, PB, Provider Backbone Bridges (PBB), Provider Backbone Bridge—Traffic Engineering (PBB-TE) and Multi-protocol Label Switching—Traffic Engineering (MPLS-TE).

SUMMARY OF THE INVENTION

It is an object of the present invention to enable a more energy-efficient use of an operator communications network without limiting the service level offered in the network.

An aspect of the invention relates to a method of controlling end-to-end communication in a communications network providing at least a first and a second path between a first and at least a second network element, wherein each of the first and second paths may include at least one further network element, comprising the following steps:
 monitoring traffic in the communications network,
 determining, based on the traffic in the communications network, the number of paths, or links, needed between the first and the at least second network element,
 if it is determined, based on the traffic load, that not all available paths are needed:
  selecting at least one path that should not be used to carry traffic,
  rerouting any traffic using the selected at least one path to at least one alternative path, and
  placing any network elements or links not carrying traffic after the rerouting in standby mode in which the power consumption of the elements is reduced, to reduce the power consumption in the network.

Another aspect of the invention relates to a control unit for controlling end-to-end communication in a communications network providing at least a first and a second path between a first and a second network element, wherein each of the first and second paths may include at least one further network element, said control unit comprising:
 a monitoring unit arranged to monitor traffic in the communications network,
 a determining unit arranged to determine, based on the traffic in the communications network, the number of paths, or links, needed between the first and second network element,
 selection means arranged to select at least one path that should not be used to carry traffic if it is determined, based on the traffic load, that not all available paths are needed,
 routing means for ordering re-routing of any traffic on the selected path or paths to at least one path that has not been selected,
 communication means for ordering any network element not arranged to carry traffic after the rerouting to adjust to a standby mode in which the power consumption of the network element is reduced.

According to the invention the network capacity can be reduced during periods of low traffic load without reducing the perceived level of service, by concentrating the traffic to fewer paths, or links. The invention therefore enables placing one or more network elements and/or links in a standby mode when the traffic load is low. On the other hand, when the traffic load is so high that more capacity of the network is needed to cater for the traffic, additional network elements and/or links may be activated. A standby mode is any type of mode that enables energy savings, by cutting power to unnecessary functions in the network element. The term standby mode in this document is intended to cover all such power-saving modes, including sleep mode, hibernation mode, etc.

In network elements where power saving commands are already available, these commands can be used.

Placing a network element temporarily in standby mode temporarily saves power and reduces the network capacity. According to the invention this is done at periods when the full network capacity is not needed. At the same time, the capacity can be restored quite easily and quickly by placing the element and/or link in active mode again, that is, powering up the element or link. Links and nodes may be powered up again by means of wake-on-LAN or similar mechanisms. The invention therefore enables power savings without reducing the perceived service level in the network. For a modern network with high speed links and routers and switches having a high power consumption, this will lead to considerable energy savings.

The configuration of the network by placing some paths or links in standby mode can be optimized by means of suitable algorithms implemented in the control unit, or by the use of tables stored in or in connection to the control unit.

The functions according to the invention may be used in any kind of network, including pure transport networks, layer 1 networks, layer 2 networks, layer 3 networks and others such as optical networks. The invention preferably makes use of existing protocols and network infrastructures, and is suitable for any traffic engineered network control protocol.

The monitoring may be performed with regard to nodes, links and/or flows in the network.

In a preferred embodiment the determining unit is arranged to determine the number of paths, or links, needed between the first and second network elements based on the current network load, to adjust to the present situation in the network. Alternatively, or in combination with this, the number of paths, or links, needed between the first and second network element is determined based on an expected network load based, for example, on the time of day, and/or the weekday. The traffic load in a network usually varies in a similar way with the time of the day, and the day of the week. For example, there are some peak hours during normal working hours, and a minimum in the middle of the night. Therefore the capacity in the network can be reduced in the middle of the night, whereas it needs to be high during the peak hours. Special events, such as popular television shows enabling telephone votes will also result in a high traffic load, which may change the traffic pattern at that time of the day or day of the week. Such occurrences can also be taken into account according to the invention.

The monitoring unit is preferably arranged to monitor incoming packets to find information enabling the identification of flows. The monitoring is preferably based on at least one of the following fields:
  source and destination IP address
  source and destination port
  layer 3 protocol type
  Ethernet headers, typically including information about virtual connections
  Type-of-service byte
  input physical and logical interface
  MPLS/GMPLS/MPLS-TP LSP end points
  Layer 2 protocol type The routing means initiates the re-routing by issuing commands to a network control/traffic engineering function in order to move traffic to parts of the network that will be kept in an active state.

The logical traffic entity to be moved can be, for example, a VLAN, a Label Switched Path (LSP) or a VPN.

The control node may further comprise identifying means arranged to identify, based on the monitored information, packets belonging to the same flow, and steering such packets to the same link.

The control node may further comprise a trend analyzing unit arranged to analyze trends in the traffic load to enable control of the network based on such trends. This will enable moving network equipment between standby mode and active mode based on expected future changes in the traffic load. In that way, adaptation to expected traffic load can be made instead of waiting until the change in traffic load has actually occurred.

An aspect of the invention also relates to a communications network arranged to provide at least a first and a second path between a first and a second network element, wherein each of the first and second paths may include at least one further network element, said network comprising a control node according to any one of the embodiments discussed above, or in the detailed description.

Acronyms
  CPU—Central Processing Unit
  GMPLS—Generalized. MPLS
  IGP—Interior Gateway Protocol
  LSA—Link State Advertisement
  LSP—Label Switched Plan
  LSR—Label Switching Router
  MPLS—Multi-Protocol Label Switching
  TE—Traffic Engineering
  VLAN—Virtual Local Area Network
  VPN—Virtual Private Network

BRIEF DESCRIPTION OF THE DRAWINGS

The invention will be described in more detail in the following, with reference to the appended drawings, in which.

DETAILED DESCRIPTION OF PREFERRED EMBODIMENTS

Figure 1A:
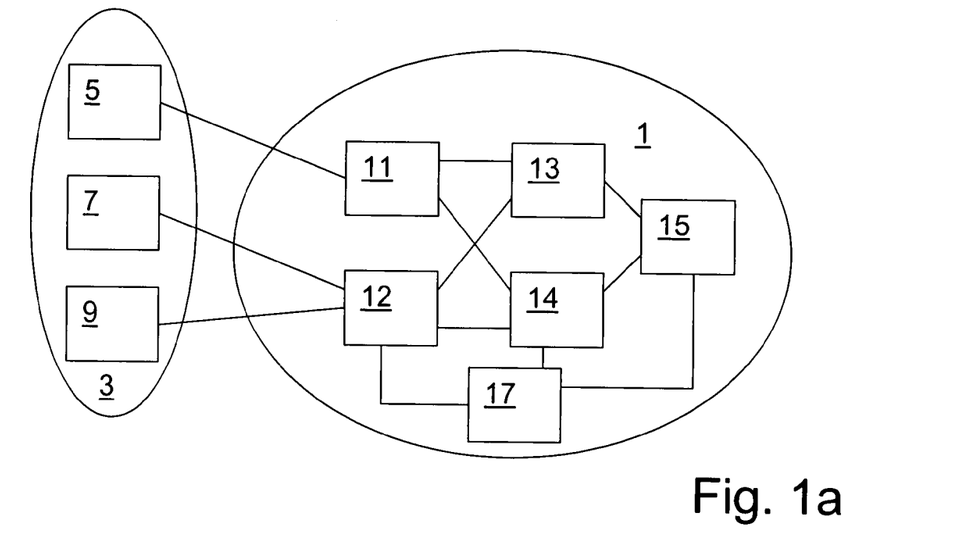
FIGS. 1a and 1b illustrate an example of a communications network in which the invention may be utilized, in different modes.

FIG. 1a illustrates an example of a communications network in which the inventive idea may be applied. As will be understood, this is only an example for illustration purposes. The inventive ideas may be applied to networks comprising more or fewer nodes, in any perceivable configuration, as long as some paths or links can be replaced by other paths or links in the network.

The network of interest in this case is an operator network 1 used to interconnect a number of local networks, such as customer networks, LANs etc. One such local network 3 is shown in FIG. 1a, having a number of nodes 5, 7, 9. The operator network comprises five network nodes. A first 11 and a second 12 network node are directly connected to different nodes in one of the local networks. A third 13, and a fourth 14 node are connected to both the first and the second node 11, 13 and to a fifth node 15. A control node 17 comprising a monitoring function is also provided, which is able to communicate with all network nodes 11, 12, 13, 14, 15 in the operator network. For clarity not all connections between the control node 17 and the network nodes are shown.

In the situation in FIG. 1a, the traffic load is assumed to be high and all network nodes 11, 12, 13, 14, 15 are therefore active and handling traffic.

Figure 1B:
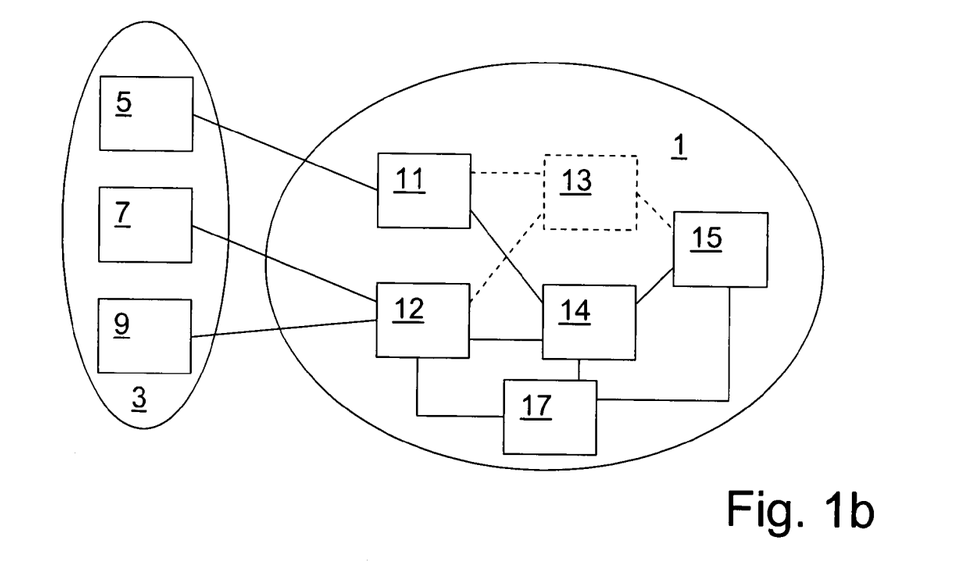

FIG. 1b illustrates the same network at a time when the traffic load in the network is lower, for example, during the night. In this case, therefore, the third network node 13 has been placed in a standby mode. This is illustrated in FIG. 1b by showing the third network node 13 having a dashed frame. The links connecting the third network node 13 to other network nodes are also placed in standby mode and are therefore also shown as dashed lines. As can be seen, all possible start and end points can still be interconnected through the nodes 11, 12, 14, 15 that are still active. In more complex networks, of course, more network nodes can be put in standby mode while still maintaining the possibility to establish all desired connections through the network.

Figure 2A:
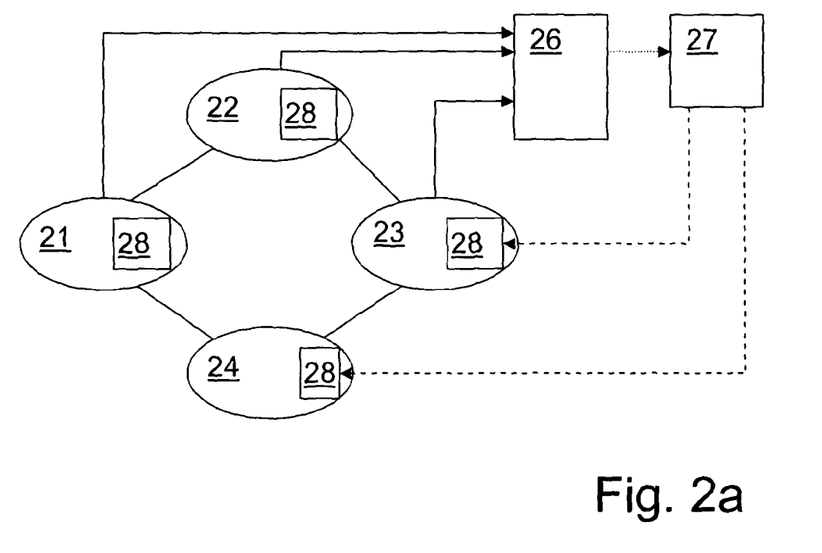
FIGS. 2a and 2b illustrate schematically two different ways of arranging some monitoring functions that may be used according to the embodiments of the invention.

FIG. 2a illustrates a first example of how the monitoring function according to embodiments of the invention may be used, in which the green metrics function is decentralized in the network. Four network nodes 21, 22, 23, 24 are illustrated. In FIG. 2a each of the network nodes is connected to its two neighbouring nodes. As will be understood the configuration shown in FIG. 2a is merely an example for illustrative purposes. Any number of network nodes may be used, and may be interconnected in any suitable way.

Each network node 21, 22, 23, 24 may for example be a router and/or a switch. All of the network nodes are connected to a monitor unit 26 arranged to monitor the traffic in the network in ways that will be discussed in more detail below. The results of the monitoring function are fed to a trends analysis unit 27. The monitor unit 26 and trends analysis unit 27 are typically part of a control node provided in the network. The solid arrows in FIG. 2a represent measurement and/or flow data transmitted from each of the network nodes 21, 22, 23, 24 to the monitor unit 26. From the monitoring unit 26, aggregated measurement and flow data are sent to the trends analysis unit 27, as indicated by a dotted arrow. From the trends analysis unit 27 aggregated trends and statistics data are sent to a green metrics unit 28 found in all nodes, as indicated by dashed arrows. Each green metrics unit 28 receives trends and statistics information from the trends analysis unit 27 and influences the mode of the respective network node 21, 22, 23, 24, that is, whether it should be in standby mode or in active mode, in dependence of the information received. In FIG. 2a, for the sake of clarity, only some of the connections are shown.

Figure 2B:
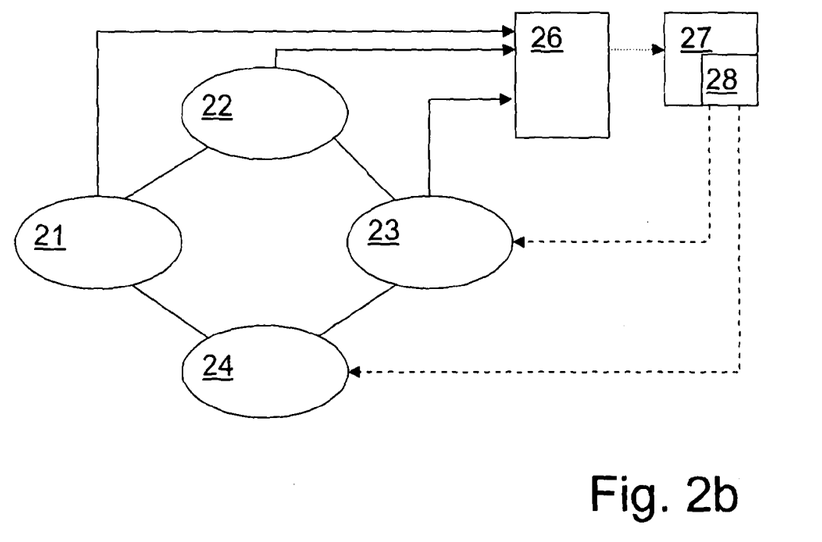

FIG. 2b illustrates a second example of how the monitoring function according to embodiments of the invention may be used, in which the green metrics function is centralized in the network. As in FIG. 2a, for illustration purposes only, four network nodes 21, 22, 23, 24 are shown, each connected to its two neighbouring nodes.

Each network node 21, 22, 23, 24 may for example be a router and/or a switch. All of the network nodes are connected to a monitor unit 26 arranged to monitor the traffic in the network in ways that will be discussed in more detail below. The results of the monitoring function are fed to a trends analysis unit 27. The monitor unit 26 and trends analysis unit 27 are typically part of a control node provided in the network. The solid arrows in FIG. 2a represent measurement and/or flow data transmitted from each of the network nodes 21, 22, 23, 24 to the monitor unit 26. From the monitoring unit 26, aggregated measurement and flow data are sent to the trends analysis unit 27, as indicated by a dotted arrow. In the configuration shown in FIG. 2b, a green metrics unit 28 is found in the trends analysis unit 27 instead of in the network elements 21, 22, 23, 24 themselves. Each green metrics unit 28 receives trends and statistics information from the trends analysis unit 27 and influences the mode of the respective network node 21, 22, 23, 24, that is, whether it should be in standby mode or in active mode, in dependence of the information received. This is illustrated by connections shown as dashed arrows from the green metrics unit 28 to the network elements. In FIG. 2a, for the sake of clarity, only the connections between the green metrics unit 28 and two of the nodes 23, 24 are shown.

Figure 3:
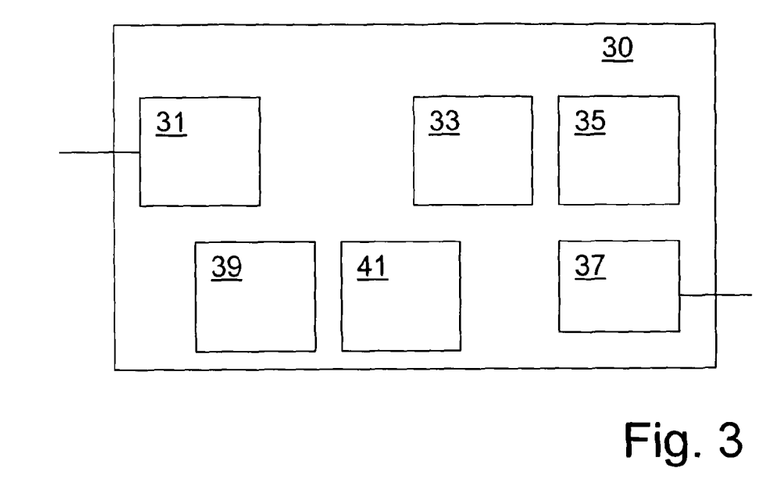
FIG. 3 is a schematic view of a control node according to an embodiment of the invention.

FIG. 3 illustrates a control node 30 according to an embodiment of the invention. The control node may also comprise other units used for other functions, for example, prior art control functions generally performed by control nodes in communications networks. Functions that are not used in connection with the present invention will not be discussed and are not shown in FIG. 3 As will be understood, the division of the control node into different units is merely done to illustrate the different functions performed by the control node. Typically, the functions performed by the different units shown in the control node are performed by one or more programs arranged to run in the control node.

The control node comprises a monitoring unit 31 arranged to monitor the traffic. The monitoring unit 31 can be arranged as is common in the art and is preferably arranged to monitor some or all of the following fields of each incoming packet.

source and destination IP address
source and destination port
layer 3 protocol type
Ethernet headers, typically including information about virtual connections
Type-of-service byte
input physical and logical interface
MPLS/GMPLS/MPLS-TP LSP end points
Layer 2 protocol type If packets match a selected number of these criteria, they are considered to belong to the same flow, or dialogue. In this way, flows can be identified and steered to other links.

Of course, the monitoring unit 31 may be arranged to monitor other parameters instead, or in addition to the parameters mentioned above, depending on the needs of the network.

As an example, S-flow/Net-flow, Remote Network Monitoring (RMON) may be used for monitoring flows end-to-end. This means that the start and end points of a tunnel can be identified. Any available monitoring function can be used to supply network status information, such as sampling, real-time measurements and store and forward.

The control node 30 also comprises a determining unit 33 arranged to receive data from the monitoring unit and determine the traffic load in the network and which paths are needed, based on the start and end points of the different flows. The determining node 33 is arranged to determine the number of paths or links needed between the various start and end points.

A selection node 35 is arranged to receive information from the determining unit 33 regarding the number of paths, or links, needed between different start and end points. If all available paths or links are not needed, the selection node 35 selects, based on the information received from the determining unit 33, which nodes should be active and which nodes can be placed in standby mode. A communication unit 37 is arranged to receive information from the determining unit 35 about which nodes are to be placed in standby mode, and to communicate this to the affected node, or nodes, to order them to switch to standby mode.

Similarly, when the selection unit 35 decides that a node that is currently in standby mode should switch to active mode, the communication unit 37 is arranged to order the affected node, or nodes, to switch to active mode.

According to embodiments of the invention, the control node 30 may comprise an identifying unit 39 and/or a trend analyzing unit 41. The identifying unit 39 is arranged to identify packets belonging to the same flow, so that such packets can be steered to the correct path, based on the data provided by the monitoring unit 31. This is beneficial, especially when the number of available paths is reduced. The trend analyzing unit 41 is arranged to monitor changes in the traffic load, and to use the changes to predict future changes in the traffic load. This enables the determining unit to determine a future need for active nodes based on predicted future traffic load. By monitoring the individual links and paths through the network statistics and trends can be identified. Analysis of the trends may be used to determine the capacity needs in the network at different times. This enables the inventive monitoring functions to prepare the network links and paths to handle traffic changes in advance.

The identifying unit 39 and the trend analyzing unit 41 are shown as separate units connected between the monitoring unit 31 and the determining unit 33 in the control node shown in FIG. 3. As the skilled person will realize, the units of the control node can be arranged relative to another in any suitable way.

Figure 4:
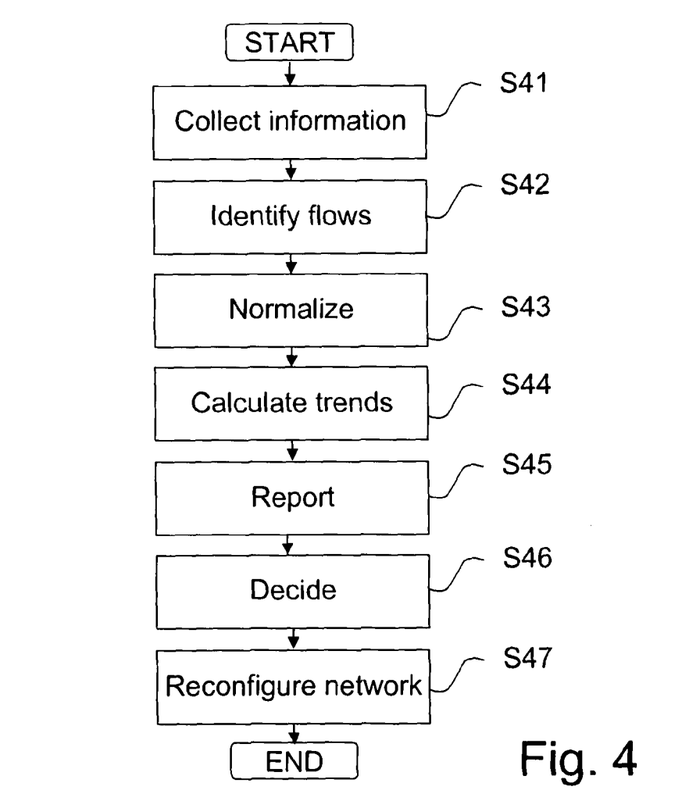
FIG. 4 is a flow chart of a preferred embodiment of the inventive method.

FIG. 4 is a flow chart of a preferred embodiment of the inventive method.

In a first step S41 information regarding each incoming packet is collected by the monitoring unit. The data enables the identification of the flow that the packet belongs to In step S42 the relevant flows that the monitored packets belong to are preferably identified by the identifying unit using the information collected by the monitoring unit.

In step S43 a normalization is performed of nodes, interfaces, network architecture and network topology. This is done to determine which nodes can be placed in standby mode and which nodes need to be active.

Step S44 is an optional step in which trends in traffic load are calculated. Trends may include, for example, increases or decreases in traffic, or patterns such as recurring peaks or minima at predictable times of the day.

Step S45 is an optional step in which the trend information calculated in step S44 is used to generate reports on current and/or predicted traffic loads.

In step S46 decisions are made regarding the configuration of the network, that is, which network nodes should be in active mode and which network nodes may be in standby mode.

In step S47 the network is re-configured. To change the mode of a network node, the control node orders the network node to go from active to standby mode, or from standby to active mode.

Functions that may be controlled in step S47 include, but are not limited to:
  optimizing the utilization of base stations by keeping macro cells active and putting micro cells in a power-saving standby mode. This involves monitoring which cells need to be active to achieve the desired coverage.
  steering protocol according to link cost to minimize the link cost in each particular situation
  moving/changing routing information, S/B-IDs, VLANs and LSPs to different links, paths and interfaces
  changing the state of each relevant node to a power-saving standby mode
  placing interfaces, interface cards and/or lasers in a power-saving standby mode.

The invention claimed is:

1. A method of controlling end-to-end communication in a communications network providing at least a first or path or link and a second path or link between a first and a second network element, wherein each of the first path or link and the second path or link includes at least one further network element, the method comprising the following steps being performed by a control node:
  monitoring traffic in the communications network,
  determining, based on the traffic in the communications network, the number of paths or links needed between the first and second network element, and
  in response to determining, based on the traffic load, that not all available paths or links are needed:
  (a) selecting at least one path or link,
  (b) rerouting any traffic that uses the selected at least one path or link to at least one alternative path or link, and
  (c) ordering any network elements not carrying traffic after the rerouting to go into a standby mode in which the power consumption in the elements is reduced,
  wherein the monitoring comprises monitoring incoming packets based on at least one of the following fields:
  source and destination IP address,
  source and destination port,
  layer 3 protocol type,
  Ethernet headers, including data regarding virtual network services,
  Type-of-service byte,
  input physical and logical interface,
  Multi-Protocol Label Switching (MPLS)/Generalized MPLS (GMPLS)/MPLS Transport Profile Label Switched Path (MPLS-TP LSP) end points, and
  Layer 2 protocol type and,
  identifying, based on the monitored information, packets belonging to the same flow, and steering such packets to the same path or link.

2. The method according to claim 1, wherein the number of paths, or links, needed between the first and second network elements is determined based on the current network load.

3. The method according to claim 1, wherein the number of paths or links needed between the first and second network elements is determined based on an expected network load, which is based on at least one of a time of day and a time of the week.

4. A control node for controlling end-to-end communication in a communications network providing at least a first path or link and a second path or link between a first and a second network element, wherein each of the first path or link and the second path or link includes at least one further network element, said control node comprising:
  a monitoring unit arranged to monitor traffic in the communications network,
  a determining unit arranged to determine, based on the traffic in the communications network, the number of paths or links needed between the first and second network element,
  a selection unit arranged to select at least one available path in response to determining, based on the traffic load, that not all available paths or links are needed,
  a routing unit for ordering re-routing of any traffic that uses the selected at least one path or link to at least one path or link that has not been selected,
  a communication unit for ordering any network element not arranged to carry traffic after the rerouting to adjust to a standby mode in which the power consumption of the network element is reduced, wherein the monitoring unit is arranged to monitor incoming packets based on at least one of the following fields:

source and destination IP address,
source and destination port,
layer 3 protocol type,
Ethernet headers including data regarding virtual network services,
Type-of-service byte,
input logical interface,
Multi-Protocol Label Switching Label Switched Path (MPLS LSP) end points, and
Layer 2 protocol type, and
an identifying unit arranged to identify, based on the monitored information, packets belonging to the same flow, and steering such packets to the same path or link.

5. The control node according to claim 4, further comprising a trends analyzing unit arranged to analyze trends in the traffic load to enable optimization of the communication network.

6. A communications network providing at least a first and a second path or link between a first and a second network element, wherein at least one of the first and second path or link includes at least one further network element, said network comprising a control node according to claim 4.

* * * * *

UNITED STATES PATENT AND TRADEMARK OFFICE
CERTIFICATE OF CORRECTION

PATENT NO.        : 8,908,677 B2                               Page 1 of 1
APPLICATION NO.   : 13/376877
DATED             : December 9, 2014
INVENTOR(S)       : Welin et al.

It is certified that error appears in the above-identified patent and that said Letters Patent is hereby corrected as shown below:

IN THE SPECIFICATION

In Column 2, Lines 1-2, delete "Backbrone" and insert -- Backbone --, therefor.

In Column 4, Line 22, delete "GMPLS-Generalized." and insert -- GMPLS-Generalized --, therefor.

Signed and Sealed this
Sixth Day of October, 2015

Michelle K. Lee
*Director of the United States Patent and Trademark Office*